US012700236B2

(12) United States Patent
Tan et al.

(10) Patent No.: US 12,700,236 B2
(45) Date of Patent: Aug. 4, 2026

(54) GENERATION OF COMMENTS CORRESPONDING TO VIDEOS

(71) Applicant: Lemon Inc., Grand Cayman (KY)

(72) Inventors: Siqi Tan, Beijing (CN); Longyin Wen, Los Angeles, CA (US); Xinyao Wang, Los Angeles, CA (US); Erica Lynne Ruzic, Singapore (SG); Kin Chung Wong, Los Angeles, CA (US); Yi Duan, Beijing (CN); Thomas Oefverstroem, Singapore (SG)

(73) Assignee: Lemon Inc., Grand Cayman (KY)

( * ) Notice: Subject to any disclaimer, the term of this patent is extended or adjusted under 35 U.S.C. 154(b) by 463 days.

(21) Appl. No.: 18/301,165

(22) Filed: Apr. 14, 2023

(65) Prior Publication Data

US 2024/0346820 A1 Oct. 17, 2024

(51) Int. Cl.
*G06F 40/40* (2020.01)
*G06F 3/0482* (2013.01)
(Continued)

(52) U.S. Cl.
CPC .............. *G06V 20/41* (2022.01); *G06F 40/40* (2020.01); *G06V 10/70* (2022.01); *G06V 20/62* (2022.01);
(Continued)

(58) Field of Classification Search
CPC ........ G06V 20/41; G06V 10/70; G06V 20/62; G06F 40/40; G06F 3/0482; G10L 15/26; G10L 25/57
(Continued)

(56) References Cited

U.S. PATENT DOCUMENTS 8,589,407 B2 * 11/2013 Bhatia .................... H04L 51/02
709/219
2016/0119390 A1 * 4/2016 Moeinifar ............ H04L 65/403
709/205
(Continued)

FOREIGN PATENT DOCUMENTS

CN 113282853 A 8/2021
CN 114339450 A * 4/2022
(Continued)

OTHER PUBLICATIONS

Chen, J., Yao, T. & Chao, H. See and chat: automatically generating viewer-level comments on images. Multimed Tools Appl 78, 2689-2702 (2019). https://doi.org/10.1007/s11042-018-5746-6 (Year: 2018).*
(Continued)

*Primary Examiner* — Jennifer Mehmood
*Assistant Examiner* — Eric James Shoemaker
(74) *Attorney, Agent, or Firm* — Alleman Hall LLP

(57) ABSTRACT

The present disclosure provides systems and methods for generating comments corresponding to an input video. Given an input video, comments with content relevant to the input video can be generated. One aspect includes a computing system comprising a processor and memory. The processor can be configured to execute a program using portions of the memory to receive an input video in a social networking system, generate at least one predicted comment corresponding to the input video based on video frames of the input video and a user profile of a target user, and present the at least one predicted comment to the target user.

18 Claims, 7 Drawing Sheets

(51) Int. Cl.

| | | |
|---|---|---|
| *G06V 10/70* | (2022.01) | |
| *G06V 20/40* | (2022.01) | |
| *G06V 20/62* | (2022.01) | |
| *G10L 15/26* | (2006.01) | |
| *G10L 25/57* | (2013.01) | |

(52) U.S. Cl.
CPC .............. *G10L 15/26* (2013.01); *G10L 25/57* (2013.01); *G06F 3/0482* (2013.01)

(58) Field of Classification Search
USPC ......................................................... 382/155
See application file for complete search history.

(56) References Cited

U.S. PATENT DOCUMENTS

| | | | | |
|---|---|---|---|---|
| 2019/0258381 | A1 | 8/2019 | Desjardins | |
| 2019/0325084 | A1* | 10/2019 | Peng | G06Q 10/00 |
| 2020/0143482 | A1* | 5/2020 | Rakshit | G06F 16/9535 |
| 2022/0141503 | A1 | 5/2022 | Cui et al. | |

FOREIGN PATENT DOCUMENTS

| | | | | | |
|---|---|---|---|---|---|
| CN | 115658935 | A | * | 1/2023 | |
| JP | 2015115892 | A | * | 6/2015 | |
| WO | WO-2021167732 | A1 | * | 8/2021 | H04L 51/52 |
| WO | WO-2022242706 | A1 | * | 11/2022 | G06F 16/3329 |

OTHER PUBLICATIONS

Commenting directly on pictures using adjectives derived from the pictures posted in a social media using NLP and Image classifiers.

An IP.com Prior Art Database Technical Disclosure. IPCOM000262454D. Published: Jun. 2, 2020. https://priorart.ip.com/IPCOM/000262454 (Year: 2020).*

Yang et al. Cross-Modal Commentator: Automatic Machine Commenting Based on Cross-Modal Information. Proceedings of the 57th Annual Meeting of the Association for Computational Linguistics, pp. 2680-2686. https://aclanthology.org/P19-1257.pdf (Year: 2019).*

Sanghyuk Chun, Seong Joon Oh, Rafael Sampaio de Rezende, Yannis Kalantidis, Diane Larlus; Proceedings of the IEEE/CVF Conference on Computer Vision and Pattern Recognition (CVPR), 2021, pp. 8415-8424 (Year: 2021).*

Sun, Teng, et al. "Response generation by jointly modeling personalized linguistic styles and emotions." ACM Transactions on Multimedia Computing, Communications, and Applications (TOMM) 18.2 (2022): 1-20. (Year: 2022).*

ISA Intellectual Property Office of Singapore, International Search Report Issued in Application No. PCT/SG2024/050236, May 16, 2024, WIPO, 5 pages.

Li, C. et al., "The Design and Research of Cross-media Retrieval," Proceedings of the 2022 6th International Conference on Communication and Information Systems (ICCIS), Oct. 14, 2022, Chongqing, China, 4 pages. (Submitted with Abstract Only).

Ma, S. et al., "LiveBot: Generating Live Video Comments Based on Visual and Textual Contexts," Proceedings of the AAAI Conference on Artificial Intelligence, Jan. 27, 2019, Honolulu, HI, 9 pages.

Xi, D. et al., "Sending or not? A multimodal framework for Danmaku comment prediction," Information Processing & Management, vol. 58, No. 6, Nov. 2021, 8 pages.

Zeng, W. et al., "Automatic Generation of Personalized Comment Based on User Profile," Proceedings of the 57th Annual Meeting of the Association for Computational Linguistics: Student Research Workshop, Jul. 28, 2019, Florence, Italy, 7 pages.

* cited by examiner

Figure 1:
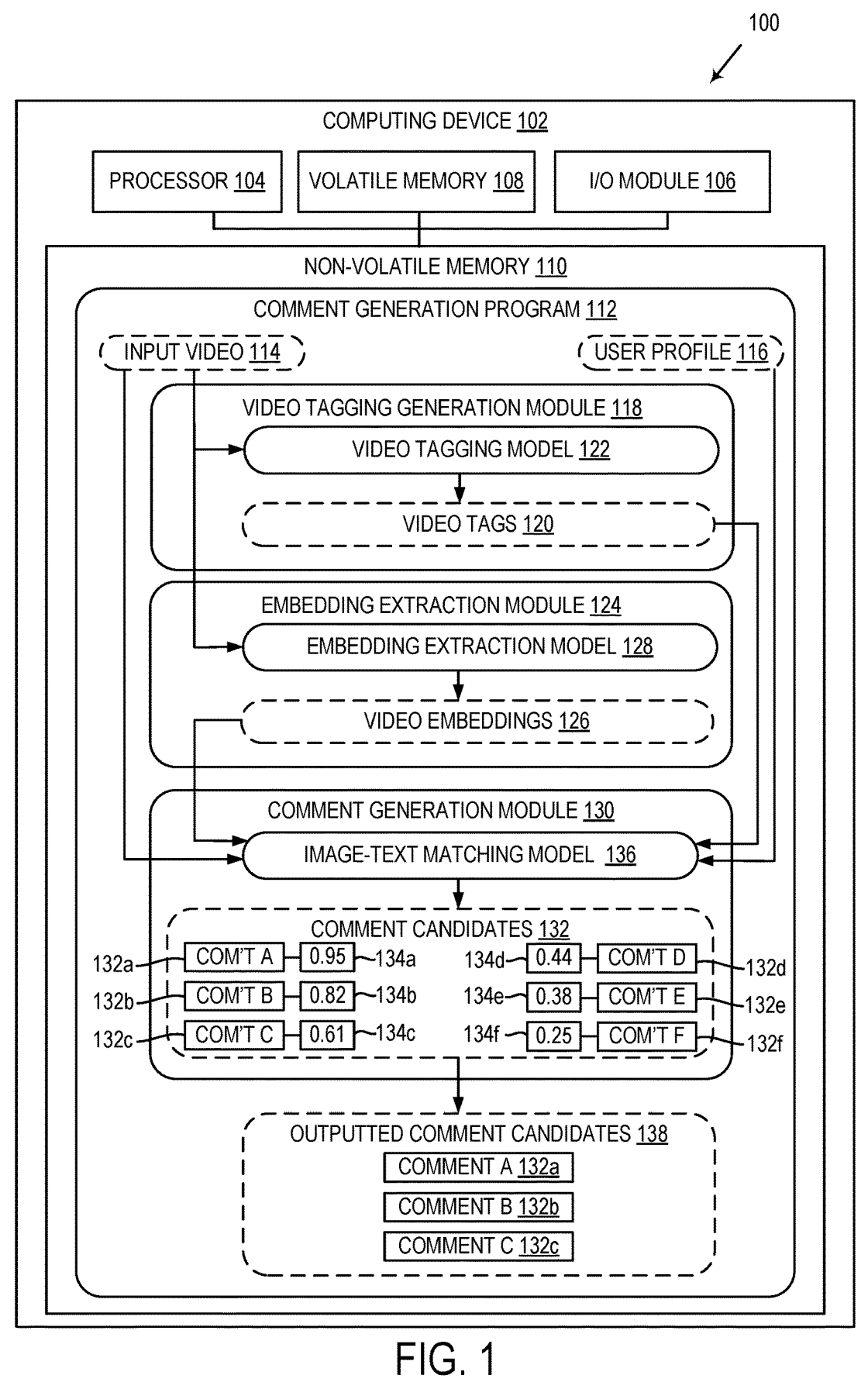

100

COMPUTING DEVICE 102

PROCESSOR 104     VOLATILE MEMORY 108     I/O MODULE 106

NON-VOLATILE MEMORY 110

COMMENT GENERATION PROGRAM 112

INPUT VIDEO 114                    USER PROFILE 116

VIDEO TAGGING GENERATION MODULE 118

VIDEO TAGGING MODEL 122

VIDEO TAGS 120

EMBEDDING EXTRACTION MODULE 124

EMBEDDING EXTRACTION MODEL 128

VIDEO EMBEDDINGS 126

COMMENT GENERATION MODULE 130

IMAGE-TEXT MATCHING MODEL 136

COMMENT CANDIDATES 132

132a | COM'T A | 0.95 | 134a     134d | 0.44 | COM'T D | 132d

132b | COM'T B | 0.82 | 134b     134e | 0.38 | COM'T E | 132e

132c | COM'T C | 0.61 | 134c     134f | 0.25 | COM'T F | 132f

OUTPUTTED COMMENT CANDIDATES 138

COMMENT A 132a

COMMENT B 132b

COMMENT C 132c

GENERATION OF COMMENTS CORRESPONDING TO VIDEOS

BACKGROUND

Generative machine learning algorithms can be implemented in probabilistic models that are able to generate new data through the analysis of regularities and patterns in training datasets. In combination with language-text matching models, such generative models can generate various types of data depending on the application. Examples of such tasks include text-to-text generation, image-to-text generation, image-to-image translation, and text-to-three-dimensional (3D) object generation. However, recently social media networks have proliferated that feature short form video content uploaded by users. Technical challenges exist to the application of such generative machine learning models to these videos.

SUMMARY

The present disclosure provides a system and method for generating comments corresponding to an input video. Given an input video, a plurality of comments relevant to the input video can be generated. One aspect includes a computing system comprising a processor and memory. The processor can be configured to execute a program using portions of the memory to receive an input video in a social networking system, generate at least one predicted comment corresponding to the input video based on a user profile of a target user, and present the at least one predicted comment to the target user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows a schematic view of an example computing system for generating a plurality of comment candidates corresponding to an input video.

DETAILED DESCRIPTION

Figure 2:
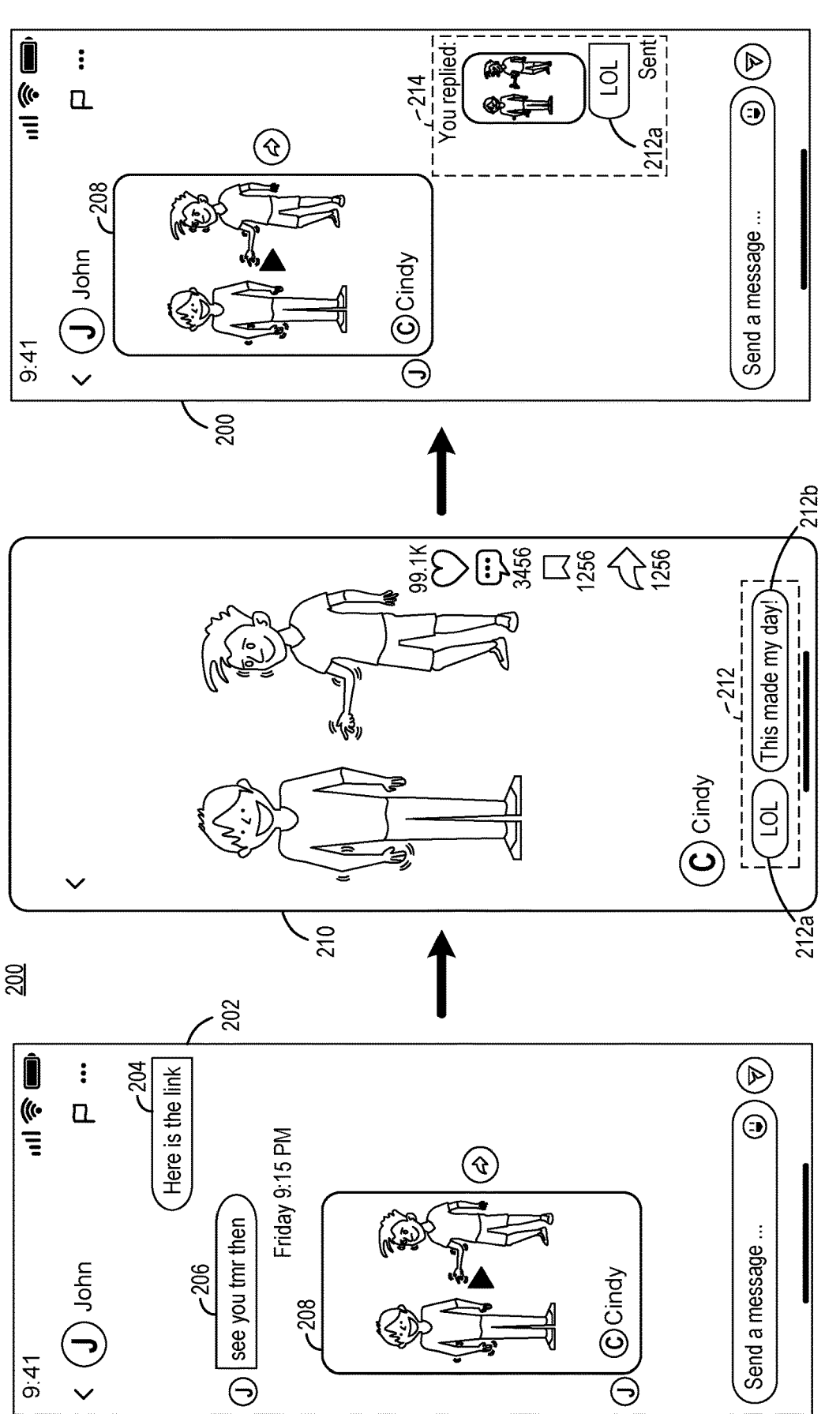
FIG. 2 shows an input video and a plurality of comment candidates in a social networking system according to a first example of the present disclosure.

Conventional social media networks display pre-written suggested responses to a text-based post, which a user may select to more quickly respond to the post. However, these conventional approaches, when applied to posts of videos, can result in irrelevant or inappropriately suggested responses to the video posts. This is due to the fact that conventional approaches only generate the suggested responses in view of the textual content in the post, rather than the content of the video. As a result, a user may be presented with undesired suggested responses, degrading the user experience. In view of the above issues, the present disclosure provides examples of a system and method for the generation of a plurality of comments corresponding to a given input video.

FIG. 1 shows a schematic view of an example computing system 100 for generating a plurality of comments corresponding to an input video 114. The computing system 100 includes a computing device 102 that further includes a processor 104 (e.g., central processing units, or "CPUs"), an input/output (I/O) module 106, volatile memory 108, and non-volatile memory 110. The different components are operatively coupled to one another. The non-volatile memory 110 stores a comment generation program 112, which contains instructions for the various software modules described herein for execution by the processor 104.

Upon execution by the processor 104, the instructions stored in the comment generation program 112 cause the processor 104 to initialize the comment generation process, which includes receiving a input video 114 in a social networking system, generating at least one predicted comment 132 corresponding to the input video 114 based on video frames of the input video 114 and a user profile 116 of a target user, and presenting the at least one predicted comment 132 to the target user. The at least one predicted comment 132 may be presented as text, emoji, and/or an image.

The comment generation program 112 includes a plurality of modules, which include a comment generation module 130 configured to generate comment candidates 132. The image-text matching model 136 of the comment generation module 130 receives video frames of the input video 114 as input, and generates comment candidates 132 as output. The most relevant comments for the input video 114 may be identified by assigning normalized probabilities 134a-f for each comment candidate (the higher the probability, the more relevant the comment candidate). Comment candidates which exceed a predetermined probability threshold may be selected to be presented to the target user as outputted comment candidates 138.

The image-text matching model 136 may be instantiated as a model which generates comments or as a model which selects comments from a set of predefined comments. One exemplary instantiation of the image-text matching model 136 is the Contrastive Language-Image Pre-training (CLIP) model, which is a deep learning model that is pre-trained on a large dataset of comment and image pairs, and associates images with corresponding comments. To predict comment candidates 132 for given video frames of the input video 114, the model ranks a set of comment candidates 132 based on how well they match the video frames. The image-text matching model 136 uses its learned knowledge of language and visual content to infer which comment candidates 132 are most likely to correspond to the video frames of the input video 114, and assigns a probability 134a-f to each comment candidate 132.

In the example of FIG. 1, the first comment candidate 132a is assigned a first probability 134a of 0.95, the second comment candidate 132b is assigned a second probability 134b of 0.82, the third comment candidate 132c is assigned a third probability 134*c* of 0.61, the fourth comment candidate 132*d* is assigned a fourth probability 134*d* of 0.44, the fifth comment candidate 132*e* is assigned a fifth probability 134*e* of 0.38, and the sixth comment candidate 132*f* is assigned a sixth probability 134*f* of 0.25. A predetermined probability threshold may be used to output only the comment candidates 138 which exceed the predetermined probability threshold. In the example of FIG. 1, a probability threshold of 0.50 is used to only output comment candidates 138 which exceed the probability threshold of 0.50, which include the first comment 132*a*, the second comment 132*b*, and the third comment 132*c*.

The comment generation program 112 may also include a video tagging generation module 118 configured to generate video tags 120. The video tagging model 122 of the video tagging generation module 118 may receive the input video 114 and generate video tags 120 corresponding to the input video 114. The video tags 120 may be generated based on themes, genres, objects, and/or actions associated with the input video 114, for example. The video tags 120 may be formatted as text or as vector embeddings. The video tagging model 122 may instantiated as a multi-modality model or a mixture of convolutional neural models and natural language processing models configured to detect high level information about the input video 114. For example, in one possible implementation, the video tagging model 122 may accept video frames and audio of the input video 114 as input, transcribe the audio of the input video 114 using a speech recognition model, and detect readable text within the video frames of the input video 114 using an optical character recognition model. The video tagging model 122 may also accept as input one or more comments made by the target user which precede the posting of the input video 114. The transcribed audio and detected readable text may be used to generate the video tags 120. The video tags 120 are subsequently received as input by the image-text matching model 136 to generate the comment candidates 132 based on the video tags 120 as well as the video frames of the input video 114 and the user profile 116 of the target user.

The comment generation program 112 may also include an embedding extraction module 124 configured to extract and generate video embeddings 126 or latent space representations of the input video 114 using an embedding extraction model 128, which may be configured as a convolutional neural network, for example. The extracted embeddings 126 may comprise feature vectors with multiple layers and attributes. Each of the multiple layers can have a normalized value between zero and one, for example. The video embeddings 126 are subsequently received as input by the image-text matching model 136 to generate the comment candidates 132 based on the video embeddings 126 as well as the video frames of the input video 114 and the user profile 116 of the target user.

FIG. 2 shows a first exemplary use implementation of the comment generation program of FIG. 1. In this example, two users are interacting with each other in a social networking system 200 through a user interface 202 for receiving and displaying posts by users or streams or user posts. The user interface 202 allows the users to post content, which may include videos, photos, links, and text. The content may also include actions taken by the users, which may include notifications that a user posted new photos, commented on a post, or added a connection to another user, for example. The posts may then be displayed to other users in a stream of content called a stream, news feed, or a live feed.

In the example of FIG. 2, a first user sends a first text 204 'Here is the link' to the second user, who replies with a second text 206 'see you tmr then'. The second user then proceeds to post a video 208 of two boys dancing. The first user selects the posted video 208 to see a magnified view 210 of the posted video 208. Responsive to the first user selecting the posted video 208, the comment generation program receives video frames of the posted video 208 and a user profile of the first user as input, and generates comment candidates based on the video frames of the posted video 208 and the user profile of the first user. Normalized probabilities for each comment candidate are assigned, and a plurality of comment candidates which exceed a predetermined threshold may be selected to be presented to the first user in the magnified view 210 as outputted comment candidates 212, which include a first comment 212*a* 'LOL' and a second comment 212*b* 'This made my day'. The comment generation program may also take into account the video tags of the video 208 in generating the comment candidates. For example, if the video tags of the posted video 208 indicate that the posted video 208 is related to baseball, and the user profile of the first user indicates interest in baseball, then baseball-related comment candidates may be generated as the outputted comment candidates 212. The first user selects the first comment 212*a*. The comment generation program receives the selection of the first comment 212*a* from the first user, and subsequently displays the first comment 212*a* as a reply 214 to the posted video 208.

Figure 3:
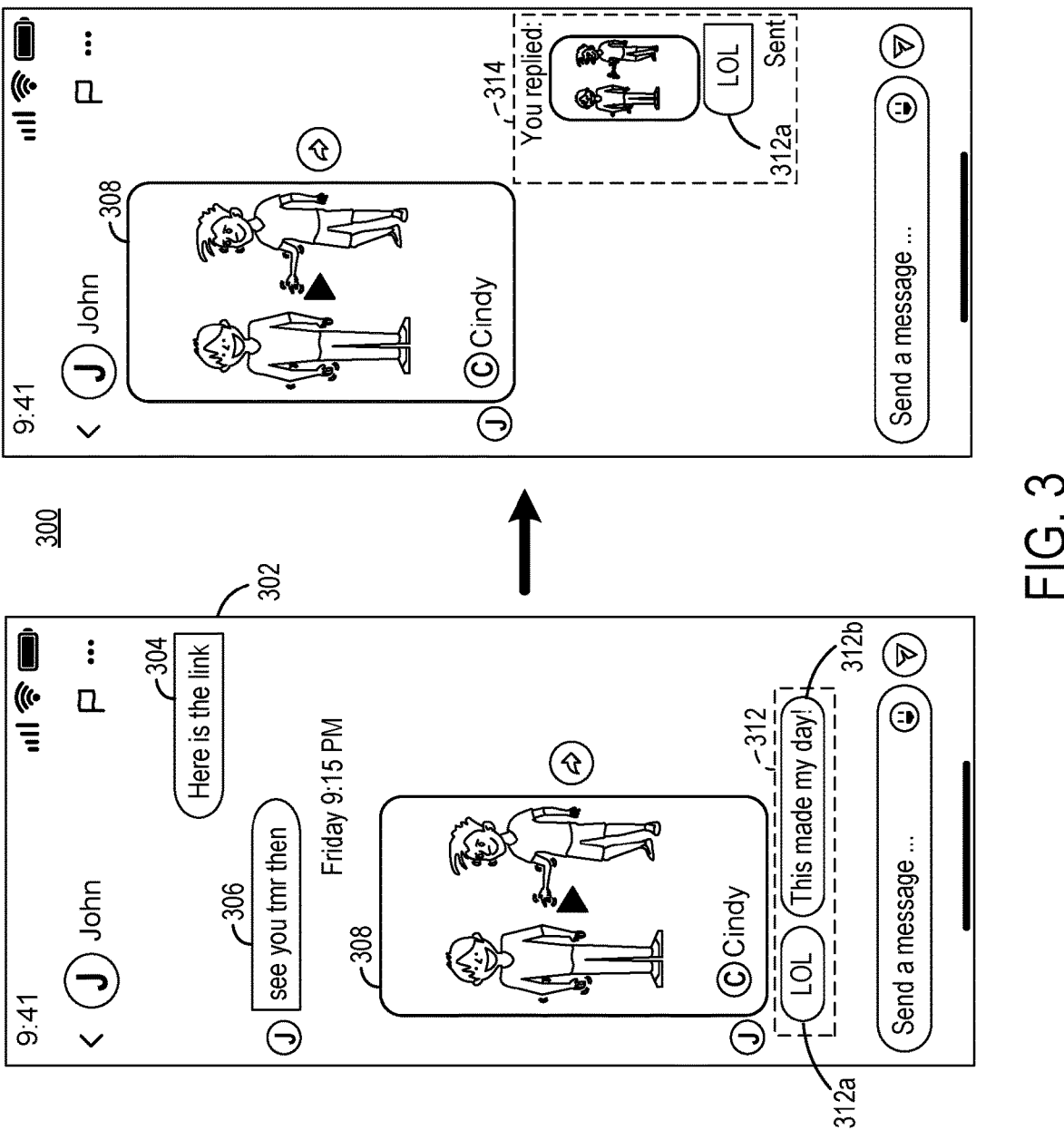
FIG. 3 shows an input video and a plurality of comment candidates in a social networking system according to a second example of the present disclosure.

FIG. 3 shows a second exemplary use implementation of the comment generation program of FIG. 1. In this example, which is substantially similar to the first exemplary use implementation, two users are exchanging texts 304, 306 on a user interface 302 in a social networking system 300. However, in contrast to the first exemplary use implementation, the comment generation program automatically generates and presents comment candidates 312, responsive to detecting that the second user has posted a video 308. Comment candidates which exceed a predetermined threshold are presented to the first user on the user interface 302 as outputted comment candidates 312, which include a first comment 312*a* 'LOL' and a second comment 312*b* 'This made my day'. The first user selects the first comment 312*a*. The comment generation program receives the selection of the first comment 312*a* from the first user, and subsequently displays the first comment 312*a* as a reply 314 to the posted video 308.

Figure 4:
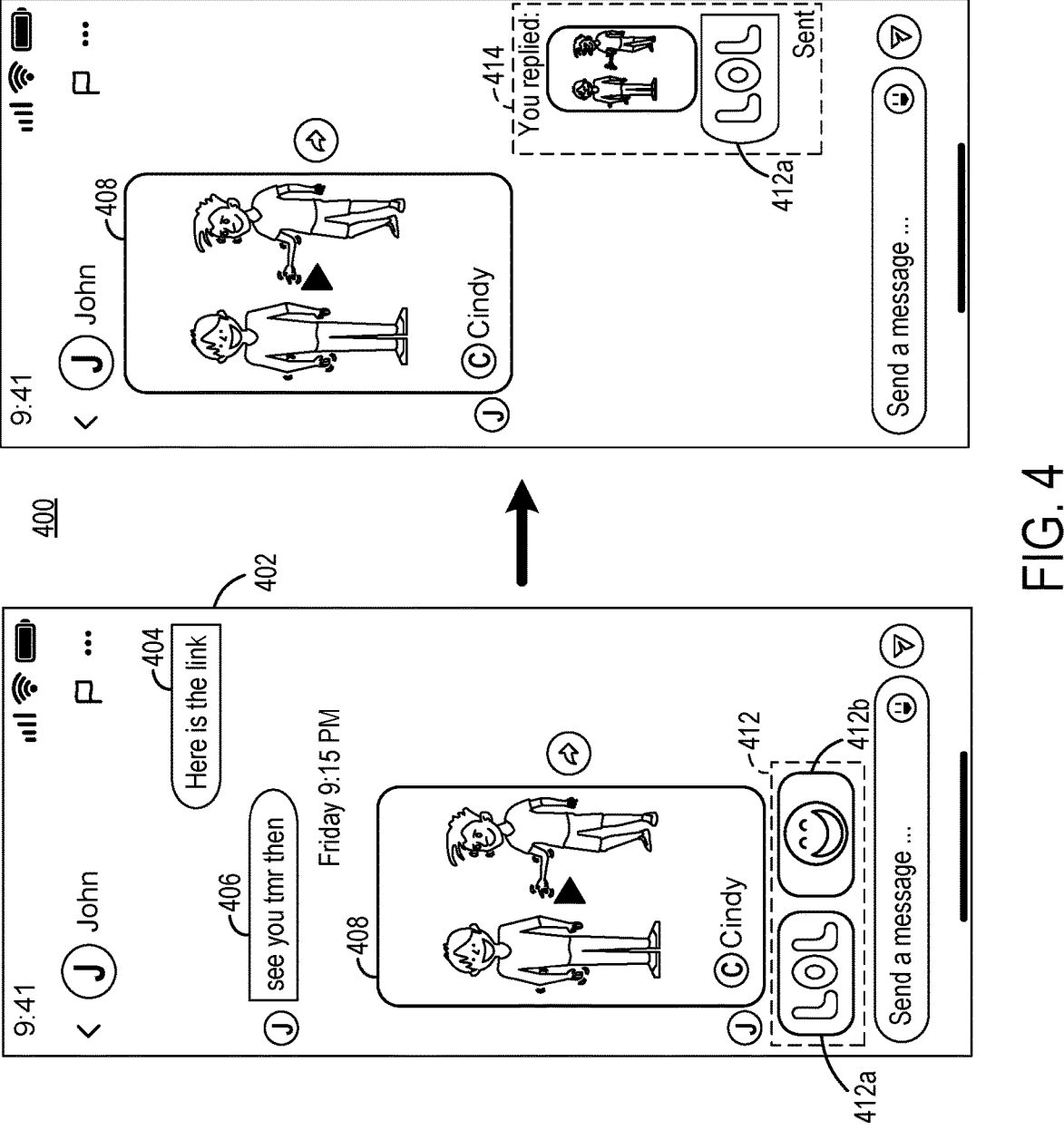
FIG. 4 shows an input video and a plurality of comment candidates in a social networking system according to a third example of the present disclosure.

FIG. 4 shows a third exemplary use implementation of the comment generation program of FIG. 1. In this example, which is substantially similar to the second exemplary use implementation, two users are exchanging texts 404, 406 on a user interface 402 in a social networking system 400. However, in contrast to the second exemplary use implementation, the comment generation program automatically generates and presents comment candidates 412 as emoji or sticker rather than as text, responsive to detecting that the second user has posted a video 408. Comment candidates which exceed a predetermined threshold are presented to the first user on the user interface 402 as outputted comment candidates 412, which include a first comment 412*a* (LOL emoji or sticker) and a second comment 412*b* (smiley face emoji or sticker). The first user selects the first comment 412*a*. The comment generation program receives the selection of the first comment 412*a* from the first user, and subsequently displays the first comment 412*a* as a reply 414 to the posted video 408.

Figure 5:
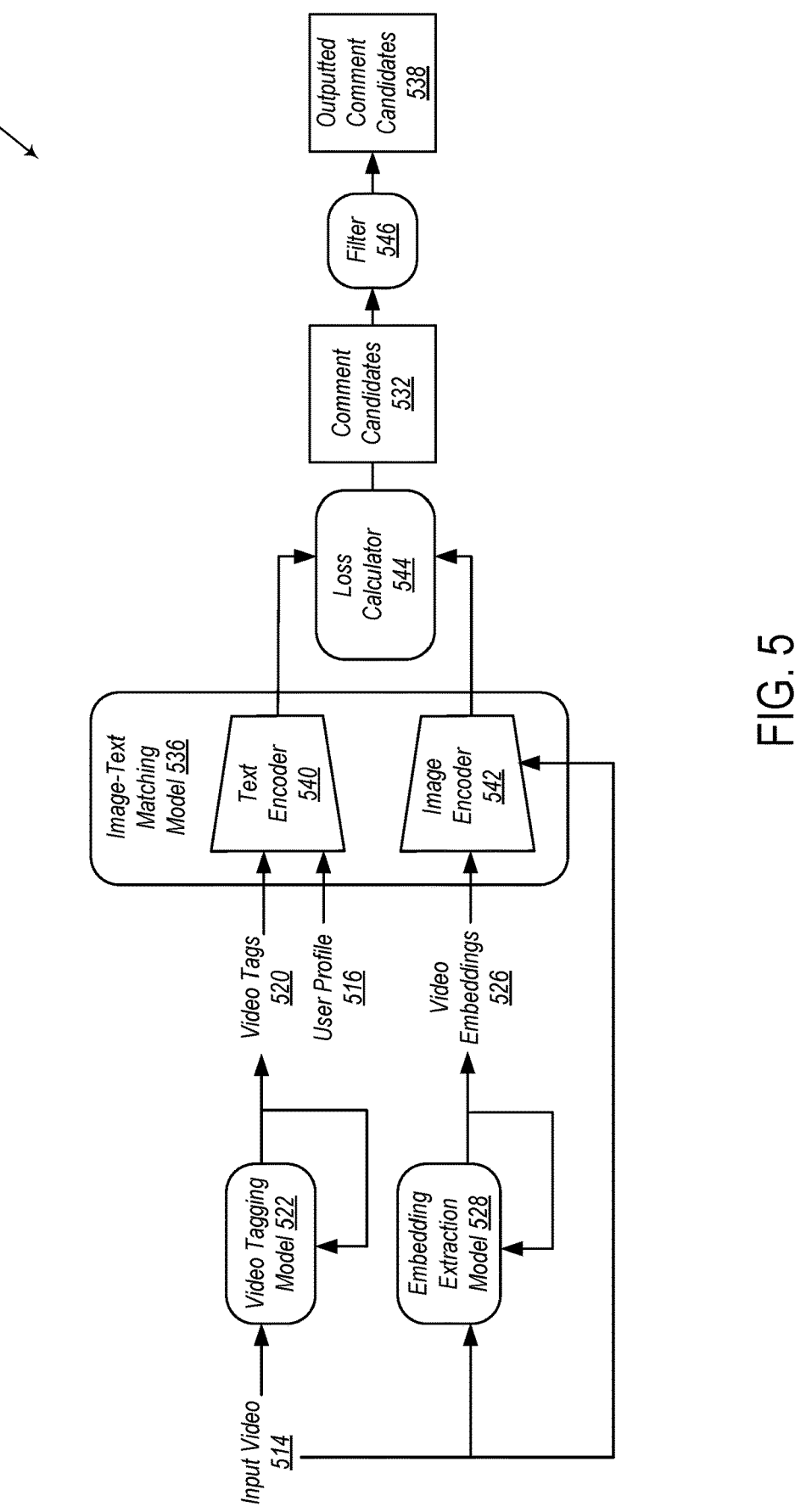
FIG. 5 shows a diagram schematically illustrating an example framework for generating a plurality of comment candidates based on an input video.

FIG. 5 shows a diagram schematically illustrating an example framework 500 for generating comment candidates 532 based on an input video 514. The framework 500 includes a video tagging model 522 that receives the input video 514 and generates video tags 520 corresponding to the input video 514. The process can repeat for a predetermined number of iterations, and a video tags 520 are outputted. The framework 500 also includes an embedding extraction model 528 configured to extract and generate video embeddings 526 or latent space representations of the input video 514. The comment generation process starts with an input video 514 which is inputted into the video tagging model 522 and the embedding extraction model 528 to generate the video tags 520 and video embeddings 526, respectively. The user profile 516 of the target user and the generated video tags 520 and video embeddings 526 are then received as input by the image-text matching model 536. By including the user profile 516 of the target user in the inputs that are received by the image-text matching model 536, the image-text matching model 536 may generate personalized comment candidates 532 for the target user for the input video 514.

The image-text matching model 536 includes an image encoder 542 for projecting the video frames of the input video 514 and the video embeddings 526, respectively, into image vectors in a learned latent space. The image-text matching model 536 also includes a text encoder 540 for projecting the video tags 520 and user profile 516 into text vectors in the same learned latent space. In such a learned latent space, the proximity of the image vectors and text vectors to each other is used to calculate normalized probabilities for image and text pairs. A loss calculator 544 may be used to calculate a loss value using the projected vectors, and the calculated loss value can then be used to guide the image-text matching model 536, which generates comment candidates 532 which are each assigned normalized probabilities. A filter 546 is used to select only comment candidates which exceed a predetermined probability threshold to be presented to the target user as the outputted comment candidates 538.

Figure 6:
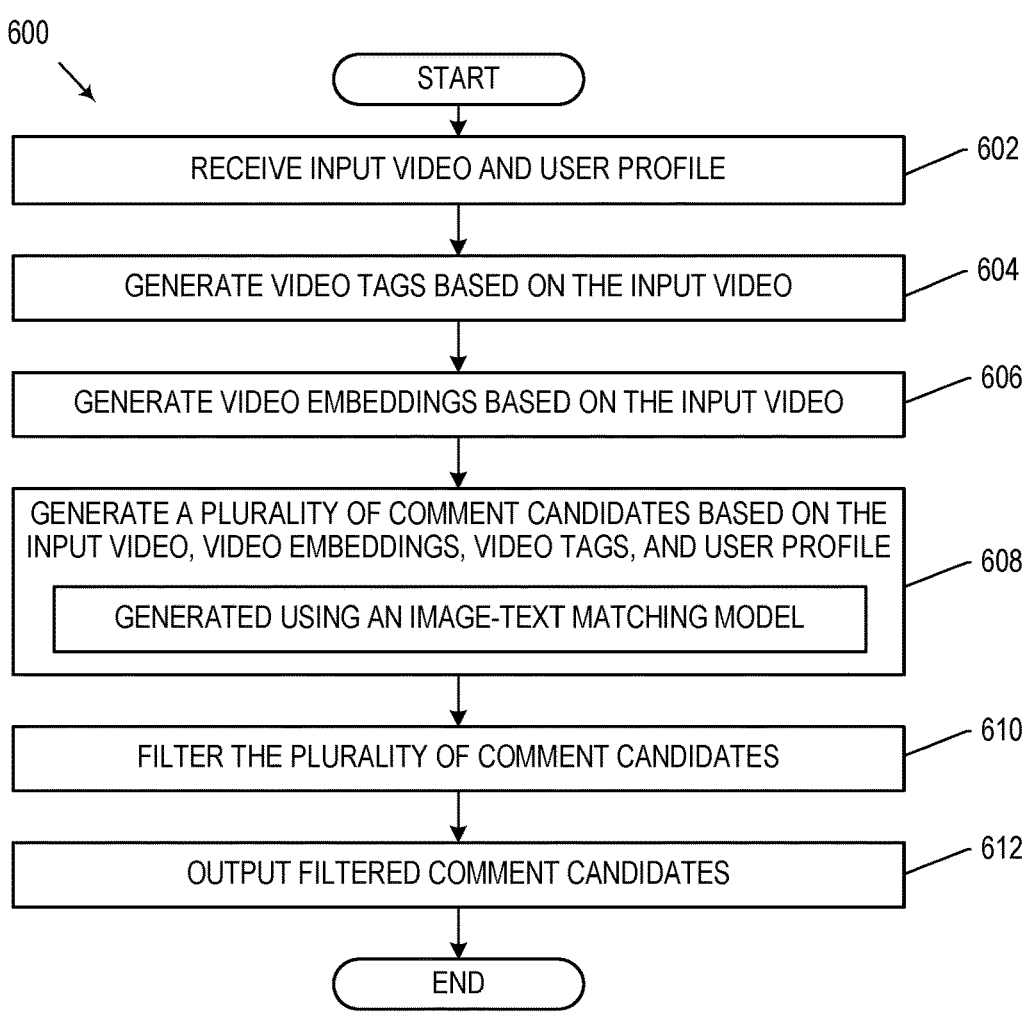
FIG. 6 shows a flow diagram of an example method for generating a plurality of comments corresponding to an input video.

FIG. 6 shows a flow diagram of an example method 600 for generating a plurality of comments corresponding to an input video. At step 602, an input video and user profile of the target user are received.

At step 604, video tags are generated based on the input video. The video tags may be generated using a multi-modality model or a mixture of convolutional neural models and natural language processing models configured to detect high level information about the input video. At step 606, video embeddings are generated based on the input video. The video embeddings may be latent space representations of the input video extracted using a convolutional neural network.

At step 608, a plurality of comment candidates are generated based on the input video, video embeddings, video tags, and the user profile. The comment candidates may be generated using an image-text matching model, which may be configured as a generative diffusion model or a CLIP model. Guidance for the image-text matching model may be provided in the form of loop feedbacks based on loss calculations of latent space vectors corresponding to the input video and a generated comment candidates.

At step 610, the generated comment candidates are filtered. The filtering may be performed by selecting only comment candidates which exceed a predetermined probability threshold. At step 612, the filtered comment candidates are presented to the target user in the social networking system.

The above-described system and method are configured to help a user reply to a video in a social networking system by predicting which comments the user is likely to use to reply to the video, thereby saving time, improving consistency and response rates, offering convenience, and increasing accessibility. A plurality of predicted comment candidates are generated based on the user profile of the user and the video frames of the video using a learned model. Accordingly, generated comments are personalized, relevant, and appropriate to the context of the posted video, thereby adding convenience for users who may not have the time or inclination to craft a personalized reply to a posted video. The automated comment generation system may make the services of social media platform more accessible for a wider range of social media users to include users with disabilities or language barriers who may struggle to type out replies quickly and accurately.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
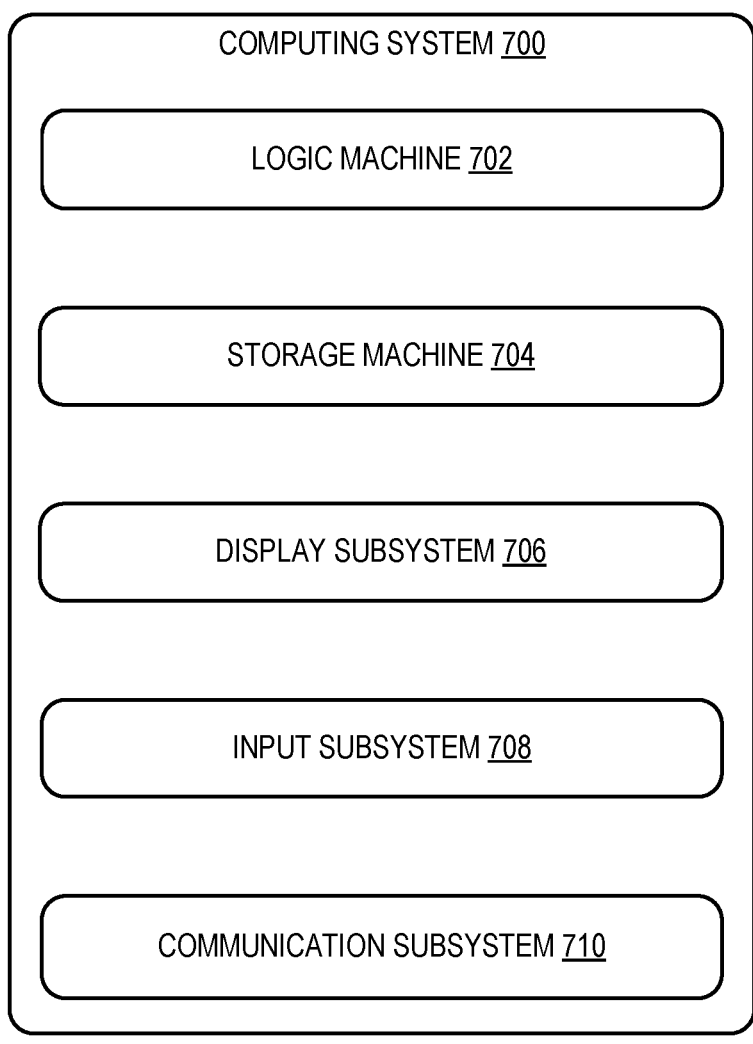
FIG. 7 schematically shows a non-limiting embodiment of a computing system that can enact one or more of the methods and processes described above.

FIG. 7 schematically shows a non-limiting embodiment of a computing system 700 that can enact one or more of the methods and processes described above. For example, the computing system 700 may be implemented onboard a head-mounted device as a controller for executing instructions to perform head posture estimation. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 5.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem 710 may be configured for communication via a wireless telephone network, or a wired or wireless local- or wide-area network. In some embodiments, the communication subsystem 710 may allow computing system 700 to send and/or receive messages to and/or from other devices via a network such as the Internet.

The following paragraphs provide additional support for the claims of the subject application. One aspect provides a comment generation system comprising a processor and a memory operatively coupled to the processor, and a comment generation program stored in the memory and executed by the processor to be configured to receive an input video in a social networking system, generate at least one predicted comment corresponding to the input video based on video frames of the input video and a user profile of a target user, and present the at least one predicted comment to the target user. In this aspect, additionally or alternatively, the at least one predicted comment is generated via a learning model trained on a dataset of comment and image pairs. In this aspect, additionally or alternatively, the at least one predicted comment is selected from a plurality of comment candidates. In this aspect, additionally or alternatively, the at least one predicted comment is generated based on one or more comments made by the target user which precede the input video. In this aspect, additionally or alternatively, the comment generation program is further configured to generate video tags corresponding to the input video, and generate the at least one predicted comment based on the video tags. In this aspect, additionally or alternatively, the video tags are generated based on at least one selected from the group of themes, genres, objects, and actions. In this aspect, additionally or alternatively, the video tags are generated based on readable text detected within the video frames of the input video. In this aspect, additionally or alternatively, the input video is labeled based on transcribed audio of the input video generated based on a speech recognition model. In this aspect, additionally or alternatively, the comment generation program is further configured to extract embeddings of the input video, and generate the at least one predicted comment based on the extracted embeddings. In this aspect, additionally or alternatively, the at least one predicted comment is at least one selected from the group of text, an emoji, and an image.

Another aspect provides a method comprising receiving an input video in a social networking system, generating at least one predicted comment corresponding to the input video based on video frames of the input video and a user profile of a target user, and presenting the at least one predicted comment to the target user. In this aspect, additionally or alternatively, the at least one predicted comment is generated via a learning model trained on a dataset of comment and image pairs. In this aspect, additionally or alternatively, the at least one predicted comment is selected from a plurality of comment candidates. In this aspect, additionally or alternatively, the at least one predicted comment is generated based on one or more comments made by the target user which precede the input video. In this aspect, additionally or alternatively, the method further comprises generating video tags corresponding to the input video, and generating the at least one predicted comment based on the video tags. In this aspect, additionally or alternatively, the video tags are generated based on at least one selected from the group of themes, genres, objects, and actions. In this aspect, additionally or alternatively, the video tags are generated based on readable text detected within the video frames of the input video. In this aspect, additionally or alternatively, the input video is labeled based on transcribed audio of the input video generated based on a speech recognition model. In this aspect, additionally or alternatively, the method further comprises extracting embeddings of the input video, and generating the at least one predicted comment based on the extracted embeddings.

Another aspect provides a comment generation system comprising a processor and a memory operatively coupled to the processor, and a comment generation program stored in the memory and executed by the processor to be configured to receive an input video in a social networking system, generate a plurality of comment candidates corresponding to the input video based on video frames of the input video, a user profile of a target user, and embeddings of the input video, present the plurality of comment candidates to the target user, receive a selection of one of the plurality of comment candidates from the target user, and post the selected comment candidate as a reply to the input video.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A comment generation system comprising:
a processor and a memory operatively coupled to the processor; and
a comment generation program stored in the memory and executed by the processor to be configured to:

receive an input video in a social networking system;
generate at least one predicted comment corresponding to the input video by projecting video-frame embeddings of the input video and text embeddings associated with a user profile of a target user into a shared cross-modal embedding space using a cross-modal embedding model trained on a dataset of comment and image pairs;
compute, within the shared cross-modal embedding space, probability scores for the comment and image pairs;
select the at least one predicted comment from the comment and image pairs based on the probability scores; and
present the at least one predicted comment to the target user.

2. The comment generation system of claim 1, wherein the at least one predicted comment is selected from a plurality of comment candidates.

3. The comment generation system of claim 1, wherein the at least one predicted comment is generated based on one or more comments made by the target user which precede the input video.

4. The comment generation system of claim 1, wherein the comment generation program is further configured to:
generate video tags corresponding to the input video; and
generate the at least one predicted comment based on the video tags.

5. The comment generation system of claim 4, wherein the video tags are generated based on at least one selected from the group of themes, genres, objects, and actions.

6. The comment generation system of claim 4, wherein the video tags are generated based on readable text detected within the video frames of the input video.

7. The comment generation system of claim 6, wherein the input video is labeled based on transcribed audio of the input video generated based on a speech recognition model.

8. The comment generation system of claim 1, wherein the comment generation program is further configured to:
extract embeddings of the input video; and
generate the at least one predicted comment based on the extracted embeddings.

9. The comment generation system of claim 1, wherein the at least one predicted comment is at least one selected from the group of text, an emoji, and an image.

10. A method comprising:
receiving an input video in a social networking system;
generating at least one predicted comment corresponding to the input video by projecting video-frame embeddings of the input video and text embeddings associated with a user profile of a target user into a shared cross-modal embedding space using a cross-modal embedding model trained on a dataset of comment and image pairs;
computing, within the shared cross-modal embedding space, probability scores for the comment and image pairs;
selecting the at least one predicted comment from the comment and image pairs based on the probability scores; and
presenting the at least one predicted comment to the target user.

11. The method of claim 10, wherein the at least one predicted comment is selected from a plurality of comment candidates.

12. The method of claim 10, wherein the at least one predicted comment is generated based on one or more comments made by the target user which precede the input video.

13. The method of claim 10, further comprising:

generating video tags corresponding to the input video; and generating the at least one predicted comment based on the video tags.

14. The method of claim 13, wherein the video tags are generated based on at least one selected from the group of themes, genres, objects, and actions.

15. The method of claim 13, wherein the video tags are generated based on readable text detected within the video frames of the input video.

16. The method of claim 15, wherein the input video is labeled based on transcribed audio of the input video generated based on a speech recognition model.

17. The method of claim 10, further comprising:

extracting embeddings of the input video; and generating the at least one predicted comment based on the extracted embeddings.

18. A comment generation system comprising:

a processor and a memory operatively coupled to the processor; and a comment generation program stored in the memory and executed by the processor to be configured to:

receive an input video in a social networking system;

generate a plurality of comment candidates corresponding to the input video by projecting video-frame embeddings of the input video and text embeddings associated with a user profile of a target user into a shared cross-modal embedding space using a cross-modal embedding model trained on a dataset of comment and image pairs;

compute, within the shared cross-modal embedding space, probability scores for the comment and image pairs;

select the plurality of comment candidates from the comment and image pairs based on the probability scores;

present the plurality of comment candidates to the target user;

receive a selection of one of the plurality of comment candidates from the target user; and post the selected comment candidate as a reply to the input video.

\* \* \* \* \*